G. D. TRESSLAR.
FRICTION CLUTCH MEMBER.
APPLICATION FILED APR. 3, 1918.

1,414,490.

Patented May 2, 1922.
2 SHEETS—SHEET 1.

WITNESS:
Arthur F. Draper

INVENTOR.
Guy D. Tresslar
BY
ATTORNEY.

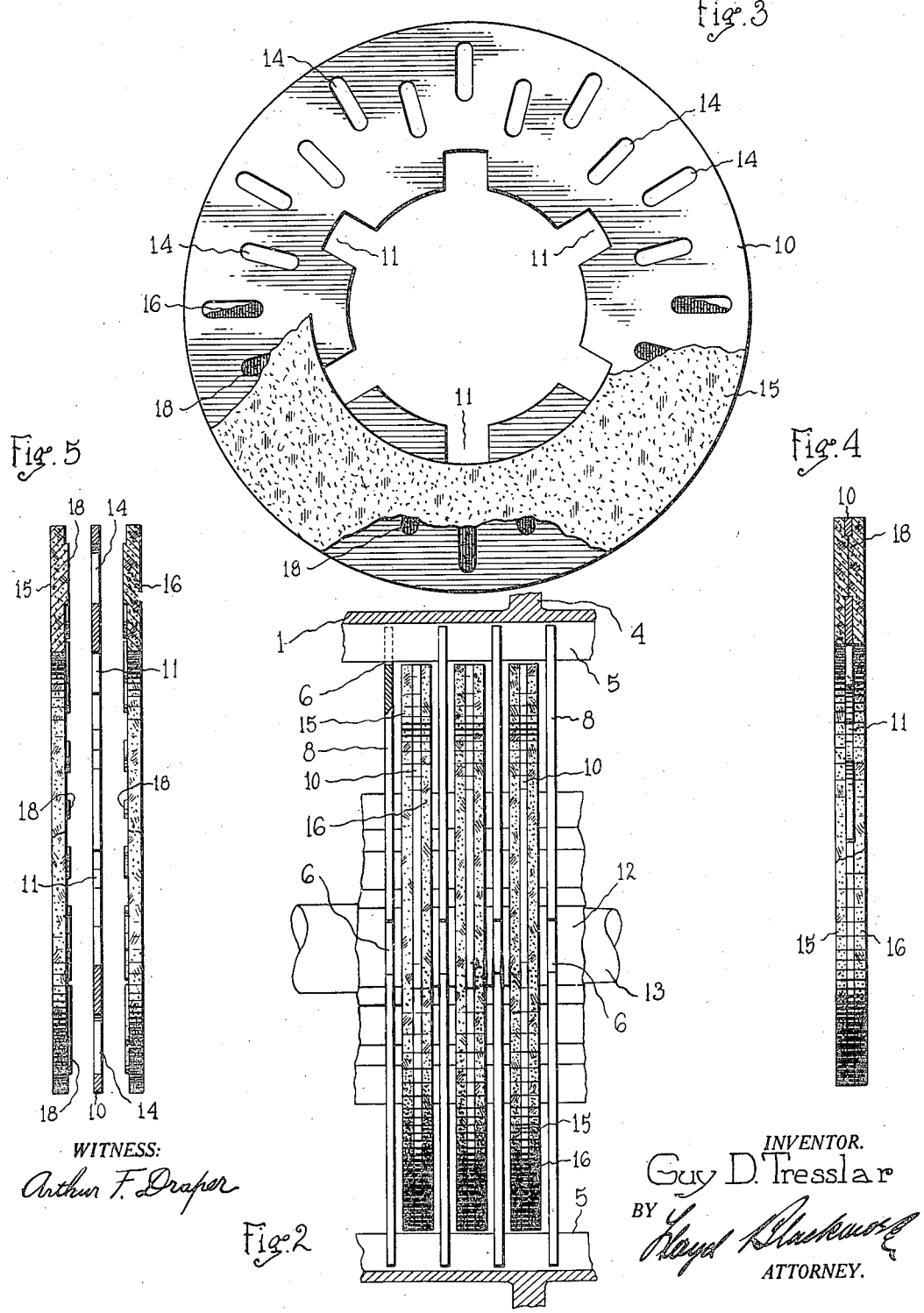

UNITED STATES PATENT OFFICE.

GUY D. TRESSLAR, OF FLINT, MICHIGAN, ASSIGNOR TO GENERAL MOTORS CORPORATION, OF DETROIT, MICHIGAN, A CORPORATION OF DELAWARE.

FRICTION-CLUTCH MEMBER.

1,414,490.  Specification of Letters Patent.  Patented May 2, 1922.

Application filed April 3, 1918. Serial No. 226,356.

*To all whom it may concern:*

Be it known that I, GUY D. TRESSLAR, a citizen of the United States, and resident of Flint, Genesee County, State of Michigan, have invented certain new and useful Improvements in Friction-Clutch Members, of which the following is a specification.

The present invention relates to a clutch, brake or other friction element, such, for example, as are used on motor vehicles.

One of the objects is to provide a compressed cork facing the particles of which are held together in the compressed state by an internal bond, as distinguished from an external bond, said facing having as an integral part thereof projections of compressed cork constructed and arranged to be received in sockets or depressions formed in a metal plate whereby the facing is carried.

Another object of the invention is to provide a friction element including a compressed cork facing supported in such manner as to be effective for wear throughout substantially its entire depth, whereby the cork may be substantially wholly utilized as friction material.

Another object is to provide a disc clutch or the like wherein a maximum friction area for a given amount of the compressed cork is presented and wherein the cork is prevented from becoming disengaged locally from its support or backing, thus avoiding jamming or grinding of the cork between the metal parts of the device. In ordinary clutches, brakes or pulleys wherein cork is used as a friction material, it presents a wearing area substantially no greater than the cross-section of the sockets in which it is received. The present invention enables the practical use not only of the area above referred to but also those areas between and around the sockets.

Another object is to provide a clutch or brake wherein a metal ring or power transmitting element is faced on opposite sides with compressed cork which is united into what is in effect an integral unit.

Another of its objects is to provide a friction clutch wherein the heat generated by the rubbing of one surface on another is effectively transmitted from the rubbing surfaces, thus increasing the life of the parts.

Another object is to provide a clutch wherein the heat is transmitted directly to the clutch outer casing.

Another object is to provide a clutch or brake wherein the heating of the cork facings or gripping surfaces is minimized and wherein it is quickly dissipated from the working surfaces thereof.

Figure 1:
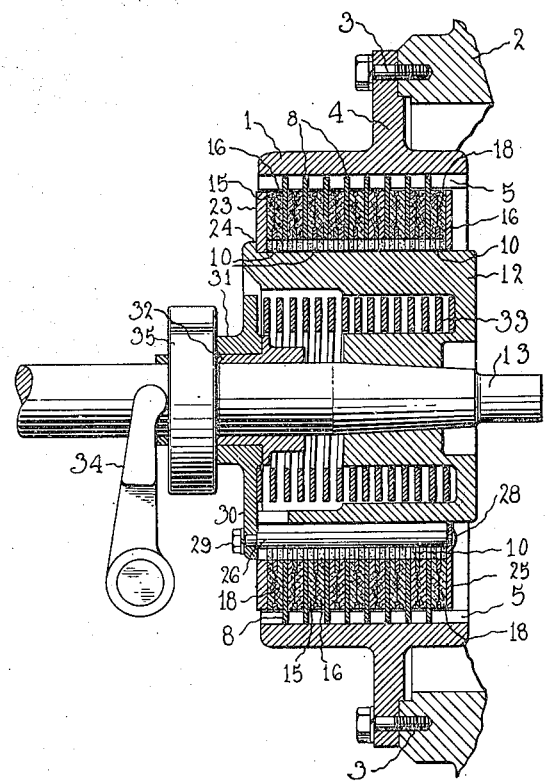
Figure 6:
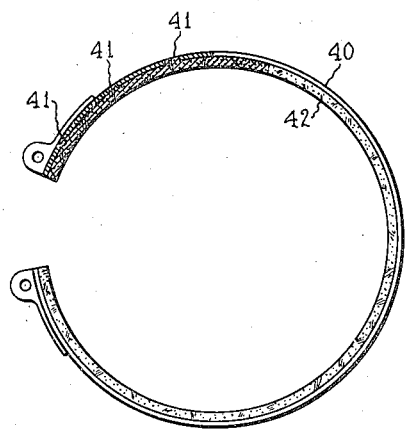

Various other objects will appear from a consideration of the following description and drawings, in the latter of which Fig. 1 is a longitudinal section of a multiple-disc clutch wherein the invention is embodied. Fig. 2 is an enlarged fragmentary side view corresponding thereto. Fig. 3 is a face view of one of the discs, parts being broken away. Fig. 4 is a part edge view, part section looking from the side in Fig. 3. Fig. 5 is a view similar to Fig. 4, the facings being detached from the metal reinforcing plate. Fig. 6 is a side view showing the application of the invention to a brake band.

Referring particularly to Figs. 1 and 2, 1 indicates a clutch casing which is connected to the fly wheel 2 or other engine driven element in any suitable manner, say by means of the bolts 3 that pass through a flange 4 on the casing. The inner surface of the casing has projecting therefrom a series of longitudinal ribs or splines 5 each of which is received in the corresponding aligned notches 6 with which the annular metal disks 8 are provided. That is, the disks 8 may move longitudinally of the casing but are constrained to rotate therewith.

These metal discs are interposed between a plurality of annular friction discs the construction of which will be best understood from Figs. 3, 4 and 5. As indicated therein, each preferably comprises a thin annular metal plate or ring 10 having in its inner face notches 11 adapted to receive longitudinal splines or ribs on the drum 12 that is fixed to the driven shaft 13 in any desired way. Thus the friction disks are free to slide longitudinally of the drum 12 but must rotate therewith. The ring 10 is also provided with the slots 14, preferably radial and arranged alternately in an inner row and an outer row as shown.

In the manufacture of the friction discs, the relatively thick annular discs or facings 15 and 16 of cork are first preferably made up by grinding cork in its natural state, thereupon treating the granulated material with a suitable binder, such as glycerin or albumin, and then compressing it, after which it is maintained under compression until the binder sets. The binder may be added during compression, rather than before; and in the preferred processes of manufacture the granulated cork is compressed and heated to a high temperature, thus fusing the natural gums, and the binder is applied to the hot cork while the latter is still under compression, it being understood that the compression is maintained constantly until the binder is fully set by cooling and drying. It is also preferred to impregnate the cork with sulphur or sulphides or oxides so that the natural gums may become vulcanized, thereby overcoming the tendency of the latter to fuse when the surface is highly heated by friction. Cork so treated or confined under pressure is rendered much tougher and more elastic than the ordinary non-compressed expanded cork, and the metal rings may be faced therewith throughout, rather than over small areas only, such as is the case when natural corks are compressed into sockets in the metal part of the clutch, brake or other element whereby they are carried.

The dies in which the compression takes place may be so shaped as to form projections 18 on one side of the facings, said projections conforming in shape and location to the slots in the rings 10. It is evident in this case that when two of the facings are coated with shellac or other suitable cement and arranged on opposite sides of a ring 10, the projections 18 will fill the slots and join the facings in effect into an integral unit. However, the material may be compressed and treated directly on the rings 10, thus squeezing the cork into the slots and vulcanizing the two facings on opposite sides of a given ring into what is in effect an integral unit.

The invention is not confined to a facing formed of ground cork, for sheets of natural cork may be compressed, heated and impregnated with binder in the same general way as the ground material; however, the latter is preferred for the reason that a more uniform product may thus be obtained and because of the difficulty of getting natural cork of the proper size and consistency.

Various means may be employed for causing the necessary gripping action between the two sets of discs. In the embodiment of the invention shown, a retaining plate 23 is arranged between a flange 24 on the drum 12, and a clamping plate 25 is arranged forward of the front disc at the opposite end of the drum. Bolts 26, which pass through the aligned discs 8 and 10—15—16 heretofore described are riveted over on the plate 25 at 28 and have their opposite ends connected by the nuts 29 to a flange 30 on the operating collar 31. The latter is arranged on a sleeve 32 which is slidable on the shaft 13. A spring 33, inserted between the forward end of the drum 12 and the collar 31, normally maintains the driving and driven discs 8 and 10—15—16 in driving relation. This driving connection may be released by moving forwardly an arm 34 against a thrust bearing 35 on the collar 31, thereby compressing the spring 33.

In the use of the clutch the heat incident to slipping is, of course, generated at the surfaces of contact, namely, between the discs 8 and the adjacent surfaces of the cork facings. The metal of the discs, being a good conductor and being in contact with the casing 1—5, it is evident that the heat is dissipated at a more rapid rate than would be the case were the cork-faced discs attached to the casing and the metal discs carried by the drum. The working surfaces of the cork are therefore kept at a relatively low temperature, and the body of the cork need be heated only to a slight extent, thus increasing the life of the material. By vulcanizing the opposite faces together a strong and unitary construction is secured but in any event the shearing strength of the projections 18 is fully developed and this, with the shellac or other cement that may be employed in case the parts are not vulcanized together affords a strong bond with the metal ring.

This bond, in either case, is of the utmost practical importance, since it prevents the cork from becoming detached between the perforations or depressions 14 or their equivalent, and adhering to the discs 8 or otherwise being ground up between the fixed and movable parts. Also, since the area of cork presented for wear is not only that corresponding to the perforations 14, but includes as well the space between and around said perforations, it follows that the size of the clutch may be materially reduced, and that a much fuller utilization of the cork for friction purposes is attained. In fact, after the facing is worn down substantially to the plate 10, the friction area presented is still equal to or comparable with that presented intitially in the usual constructions.

It is evident that the actual details of construction may be modified within wide limits without departing from the invention. The shape and arrangement of the openings in the plates 10 is subject to variations—they might take the form of notches extending inwardly from the outer edge of the discs. Somewhat the same result may be attained by depressions or offsets of the metal without actually perforating it, but a thicker disc would thus be necessary. The cork faced members may of course be carried by the casing, but the heat would not then be so effectually dissipated as in the construction shown. In the application of the invention to brake bands the flat ring 10 is replaced by a metal band 40 which is perforated to receive projections 41 (corresponding to the projections 18 except that they pass entirely through the openings) on the facing 42, the latter being constructed in the same general manner as the facings heretofore described. It might, of course, be applied in other ways, and to other mechanical elements, such, for example, as pulleys.

I claim:—

1. A friction element comprising a force transmitting member having openings therein and a facing of compressed cork the parts of which are retained in the compressed state by internal bonding, said cork facing including as an integral part thereof projections received in the openings.

2. A molded friction element formed of compressed cork impregnated with a binding medium, said element having portions offset from the general contour thereof to form shearing surfaces.

3. A friction element comprising a metal reinforcement, facings of compressed cork for the opposite sides thereof, said facings being vulcanized together.

4. An article of manufacture comprising a layer of compressed cork the parts of which are retained in the compressed state by internal bonding, said layer having surfaces offset from the main working surface thereof, and a thin metal stress transmittting member with which said offset surfaces coact to transmit stresses from the cork to the metal.

5. In a friction element, a thin perforated metal member, facings of compressed cork for the opposite sides thereof, said cork being impregnated with a binder whereby it is permanently held in the compressed state, the facings being vulcanized together through the perforations in the metal member.

6. In a friction element, a thin metal ring-like disc having openings therein, facings of compressed cork for the opposite sides of the disc, said cork being permanently held in the compressed state by an internal binding medium and filling the openings.

7. In a friction element, a thin metal member having a plurality of rows of perforations therein, facings of permanently compressed cork forming continuous friction surfaces over and between the perforations, said cork facings being joined to one another through the perforations to form a substantially integral unit.

8. In a friction element, a thin metal member presenting a general surface of predetermined contour, said element also presenting other surfaces angularly disposed with reference to the general surface, a facing of compressed cork treated with a binder whereby it is permanently held in the compressed state, said facing conforming to the general surface of the metal member and to the surfaces angularly disposed with reference thereto and being cemented to the metal member.

9. A friction member comprising a core piece having perforations and frictional material embracing said core piece, entering said perforations and being anchored therein.

10. A frictional member comprising a core piece having holes passing through it, and frictional material applied upon opposite faces of said core piece over such holes and being extruded thereinto, the parts or plugs of the material thus entered into the holes being joined together.

11. A multiple disc or friction clutch ring, comprising a metal disc perforated at intervals, and a friction facing molded thereto and vulcanized.

12. A friction surface member comprising a metal core piece perforated at intervals and friction facing molded thereto and vulcanized.

In testimony whereof I affix my signature.

GUY D. TRESSLAR.